United States Patent [19]

Woodson

[11] Patent Number: 4,878,320

[45] Date of Patent: Nov. 7, 1989

[54] ABRASIVE FEED SYSTEM

[75] Inventor: Jerry P. Woodson, Houston, Tex.

[73] Assignee: Whitemetal, Inc., Houston, Tex.

[21] Appl. No.: 128,589

[22] Filed: Dec. 4, 1987

[51] Int. Cl.[4] .......... B65G 53/40

[52] U.S. Cl. .......... 51/320; 51/321; 51/410; 51/436; 51/439; 410/46

[58] Field of Search .......... 51/319, 320, 321, 410, 51/413, 436, 439; 410/90, 136, 137, 138, 140, 141, 145, 146, 153, 46 X, 139

[56] References Cited

U.S. PATENT DOCUMENTS

| | | | |
|---|---|---|---|
| 2,726,137 | 12/1955 | Davis | 406/46 |
| 4,048,757 | 9/1977 | Kubus | 51/436 |
| 4,174,571 | 11/1979 | Gallant | 51/428 |
| 4,412,402 | 11/1983 | Gallant | 51/439 |
| 4,492,575 | 1/1985 | Mabille | 51/439 |
| 4,522,597 | 6/1985 | Gallant | 51/439 |
| 4,586,854 | 5/1986 | Newman | 406/138 |
| 4,615,649 | 10/1986 | Sharpless | 406/138 |
| 4,753,094 | 6/1988 | Spears | 51/320 |

*Primary Examiner*—Robert P. Olszewski
*Assistant Examiner*—Blynn Shideler
*Attorney, Agent, or Firm*—Dodge, Bush & Moseley

[57] ABSTRACT

In accordance with illustrative embodiments of the present invention, a hopper containing a sodium bicarbonate abrasive is pressurized with a dry gas such as nitrogen. The abrasive is fed into a transport line through which compressed air flows toward a nozzle, and pressures in the hopper and transport line are regulated so that the hopper pressure is greater than the transport line pressure by an amount that keeps the abrasive in the hopper very dry so that the same differential pressure causes a precisely metered amount of abrasive flow.

23 Claims, 2 Drawing Sheets

ABRASIVE FEED SYSTEM

FIELD OF THE INVENTION

This invention relates generally to a liquid-propelled, abrasive blast cleaning system, and particularly to a selective abrasion system for removing a covering or coating from a material to be cleaned without damaging an underlying substrate thereof.

BACKGROUND OF THE INVENTION

To remove the paint from an aircraft, a fiberglass boat or the like, so that it can be repainted as needed, a selective abrasion system is both desirable and necessary. Such system must have the capability of removing a paint coating without damaging the underlying metal or other substrate. The removal of paint by conventional sand blasting can result in too much anchor pattern (surface roughness) in the aluminum sheet. Blast particles such as crushed walnut shells and plastic buttons have been tried, and although brittle paint was removed, the particles are so resilient that they will bounce off of a flexible urethane coating. Agricultural products such as rice hulls and corn cob grit also have been tried, however these particles are so small and sharp that the aluminum is cut too deep. Problems in obtaining sufficient flow of these types of abrasive particles are almost insurmountable. Some agricultural abrasives contain oil so as to present a fire or explosive hazard, and leave an oil film that can prevent good paint adhesion. Thus the need for an effective selective abrasion system has persisted, particularly in view of the fact that stripping and repainting of certain large commercial aircraft can cost several hundred thousand dollars. Of course any paint removal scheme that also removes a significant amount of the metal must be avoided for safety reasons.

Applicants have therefore sought an abrasive compatible with a wet blast stripping system that is sharp, dense and hard enough to cut through and remove paint without damaging the underlying aluminum, fiberglass or a carbon fiber laminate. Their investigations have revealed that an abrasive particle must be used that has a scratch hardness characteristic not substantially greater, and preferably slightly less than the scratch hardness of aluminum, which is about 3 on the Mohs scale. It has been discovered that sodium bicarbonate is an extraordinarily good abrasive material for the foregoing application. Sodium bicarbonate has a Mohs hardness of about 3, a density similar to that of conventional blast particles such as sand, and good mass. This material is relatively inexpensive, readily available in large quantities, and in various particle sizes.

Tests of a wet blast cleaning system demonstrated that water pressures in the range of 1500–2000 psi with air pressure of 60 psi, gave satisfactory performance. However, the flow of sodium bicarbonate particles from the abrasive hopper was somewhat irregular and inconsistent, so that the process could be considered to be impractical except in a laboratory test environment. Thus applicants sought and found a solution to this problem, which is the subject of the present invention.

The general object of the present invention is to provide a new and improved abrasive feed system in a wet or dry blast cleaning process that allows use of an abrasive such as sodium bicarbonate.

Another object of the present invention is to provide a new and improved liquid-propelled abrasive cleaning system that provides selective abrasion using sodium bicarbonate particles as the abrasive material.

SUMMARY OF THE INVENTION

These and other objects are attained in accordance with the concepts of the present invention through the provision of a wet blast system comprising nozzle means for applying a high pressure stream of water and propelled sodium bicarbonate particles to remove a coating of paint from a surface such as aluminum sheet, pump means and compressor means for providing respective pressurized supplies of water and air to said nozzle means, and hopper means for providing a pressurized supply of sodium bicarbonate particles to said nozzle means where such particles are propelled by a jet of water onto the surface to be cleaned. In order to provide a regulated flow of sodium bicarbonate particles from said hopper, a source of dry gas such as nitrogen is supplied to the hopper at a regulated pressure such that said particles enter the air line leading to the nozzle means at a pressure that exceeds the pressure of the supply of air. In this manner, the compressed air which contains moisture is prevented from entering the hopper, and a regular flow of a controlled amount of abrasive particles is fed into the air line leading to the nozzle means. This system allows the use of an abrasive such as sodium bicarbonate, as well as a variety of other abrasive particles that heretofore could not be used due to the moisture content of the supply of compressed air that was used to pressurize the hopper. As a result a selective abrasion action can be achieved in a highly efficient and effective manner.

BRIEF DESCRIPTION OF THE DRAWINGS

The present invention has other objects, features and advantages which will become more clearly apparent in connection with the following detailed description of preferred embodiments, taken in conjunction with the appended drawings, in which.

DETAILED DESCRIPTION OF A PREFERRED EMBODIMENT

Figure 1:
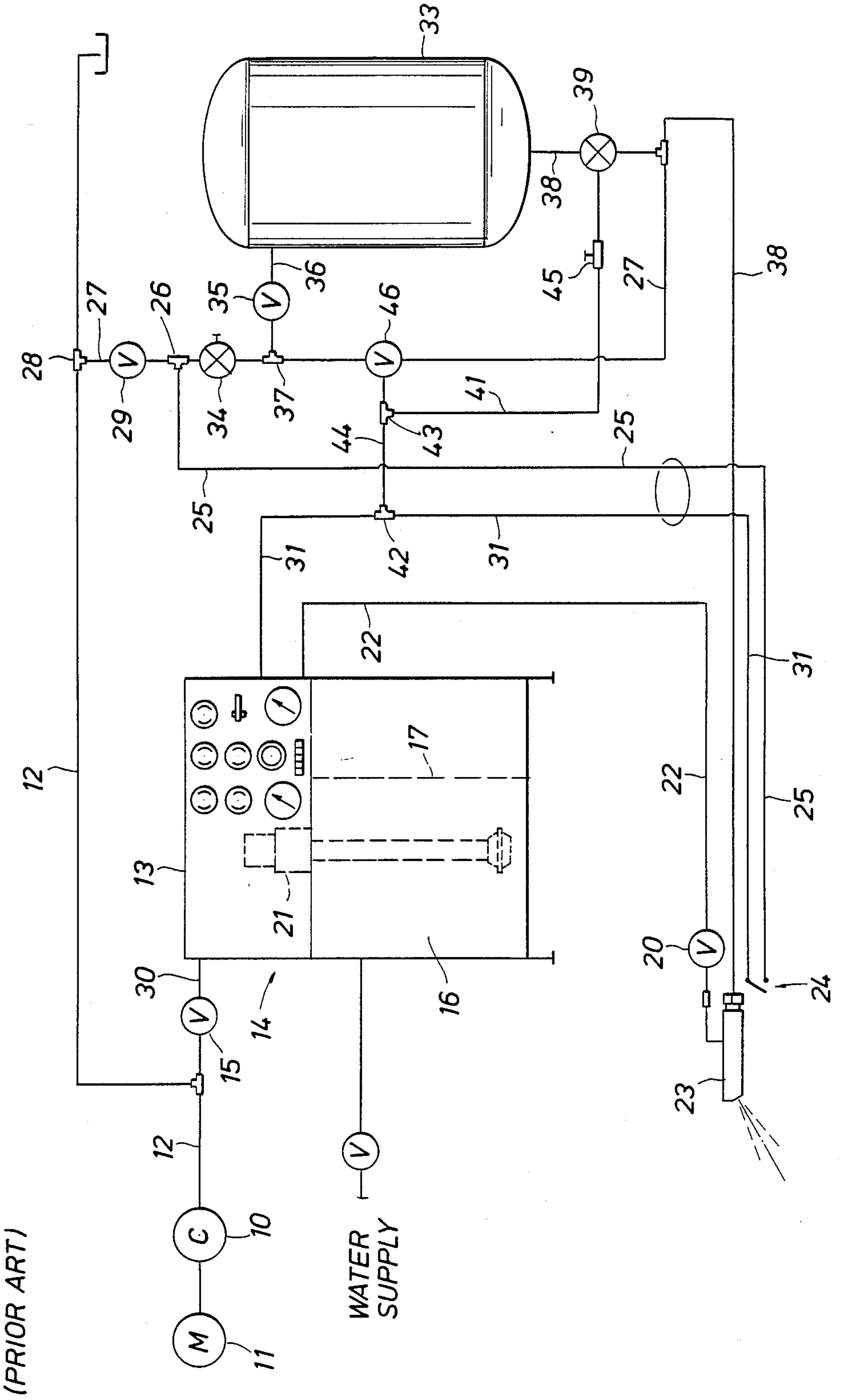
FIG.1 (PRIOR ART)
FIG. 1 is a schematic of a wet blast cleaning system of the prior art employs sand particles as the abrasive medium.

Referring initially to FIG. 1, a prior liquid propelled abrasive cleaning system of the type shown in co-pending application Ser. No. 872,095, filed June 6, 1986, and assigned to the assignee of this invention, is illustrated. The system includes an air compressor 10 which is driven by a suitable motor 11 to provide a supply of air under pressure to a line 12, preferably in a volume range of from 30–90 cfm, plus the approximately 180 cfm required for operation of a blast nozzle. Pressurized air is fed from the line 12 to a control station or cabinet 14 through a branch line 30 and through an air shut-off valve 15. A supply of water is fed to the lower section 16 of the station 14, which comprises a storage tank that can have separate compartments for water and an oxidation inhibitor. A pneumatically operable pump 21 (shown in phantom lines in FIG. 1) is housed in control station 14, whereby water containing a controlled amount of inhibitor is fed under high pressure to a flexible output hose 22 that communicates with the inlet of a blast nozzle 23. The hose 22 can be relatively long, for example 250 feet, to enable the operator to conduct operations a substantial distance away from the control station 14. A normally closed "dead-man" control valve 24 is mounted adjacent to the nozzle member 23 and functions to prevent operation of the nozzle unless the control valve 24 is being held open by the operator by depression of a spring-loaded actuator handle. In this manner, all flow of high pressure water and abrasive particles to the nozzle member 23 is automatically shut off when the operator releases the handle, or if the nozzle member is inadvertently dropped. The inlet of the dead-man valve 24 is connected by a flexible line 25 to a tee 26 in a line 27 that communicates with main air supply line 12 at tee 28. An air shut-off valve 29 is positioned in the line 27 between the tees 28 and 26. The outlet of the dead-man control valve 24 is connected by another flexible line 31 to an appropriate fitting on the side of the upper section 13 of the control station 14, whereby an air pressure signal is given to the control station 14 when the dead-man valve 24 is actuated.

The nozzle member 23, which need not be shown in details, includes a tubular body having a propulsion chamber, an inlet for abrasive particles, an inlet for water, and an outlet for a spray blast of water and propelled abrasive particles. The dead-man valve 24 includes a body that is mounted to the hose 38 in a suitable manner, the body having an inlet for the line 25 and an outlet for the line 31. A spring-loaded handle is pivoted to the body, and, when depressed by the operator, functions to open a valve element within the body to communicate the line 25 with the line 31. When the handle is released, the valve automatically closes to prevent communication of the line 25 with the line 31. A shut-off valve 20 connects the line 22 to the water inlet of the nozzle assembly 23.

Referring still to FIG. 1, a supply of abrasive particles, such as #3 sand, is contained in a hopper or "pot" 33, sized to hold a suitable amount of abrasive, for example 1000 pounds. Air under pressure from the line 12 passes through a regulator valve 34, a shut-off valve 35 in a branch line 36 from tee 37 in line 27, and into the tank 33 through a suitable fitting, so that the tank 33 is under pressure. A sand feed line 38 leads from the bottom of the tank 33 to a tee connecting the air line 27 to a transport line 38 that goes to to the sand inlet of the nozzle member 23. A pilot-operated sand metering and shut-off valve 39 is located in the line 38 adjacent the pot 33. The valve 39 is a normally closed device that is opened in response to air pressure in line 41, which is connected to the air signal line 31 by tees 42 and 43 and a branch line 44. A three-way valve 45 in the line 41 includes a bleed port to enable air pressure to be manually bled off when desired. The line 27 coming from the supply line 12 continues to a normally closed air valve 46 having a pneumatic operator connected to the line 44. Thus the valve 46 is opened only when there is an air pressure signal in line 31 due to opening of the dead-man control valve 24, so that a metered mixture of sand particles and air is supplied to the line 38 only when the nozzle member 23 is in operation.

The internal and external components of the station 14 are disclosed in detail in the above-mentioned application Ser. No. 872,095 and need be described in only a general way herein. Suitable indicators, gauges, pump stroke counter and water valve actuator handle are used to monitor the operation of the unit. The system shown in FIG. 1 provides outstanding cleaning action where an abrasive such as sand particles can be used. In order to be able to use an abrasive such as sodium bicarbonate particles in accordance with the present invention, the structure shown in FIG. 2 is used.

Figure 2:
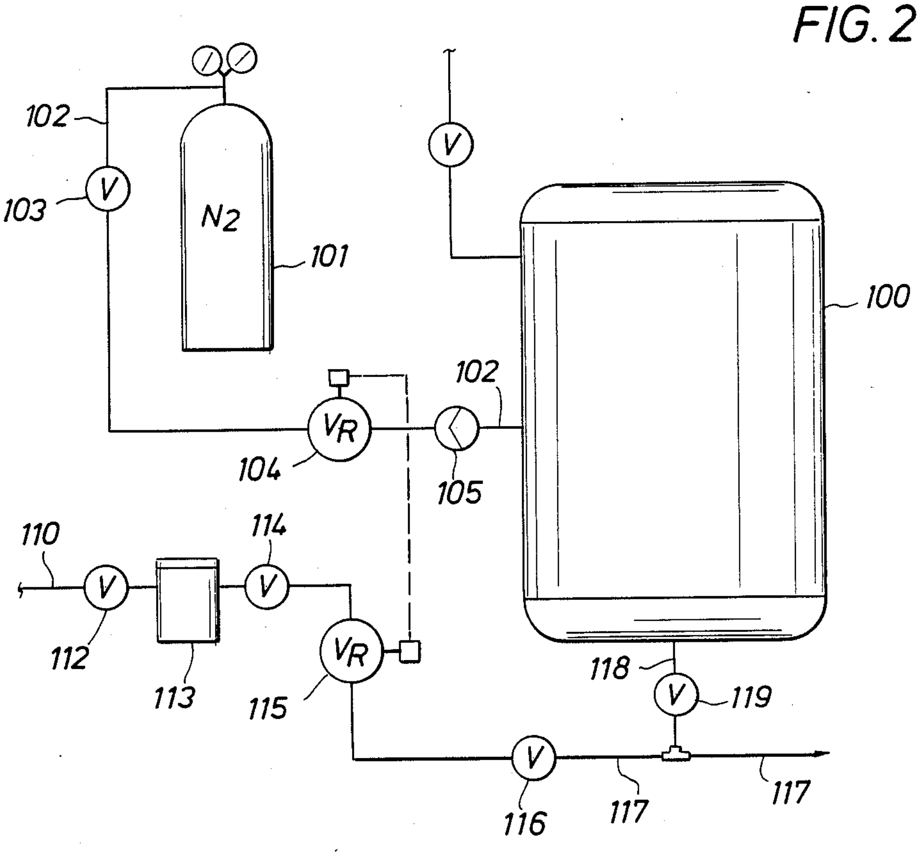
FIG. 2 is a plan view of an embodiment of a pressurized hopper, valve and flow line system which allows use of sodium bicarbonate as an abrasive agent for selective removal of paint from an underlying substrate.

Referring to FIG. 2, the hopper or "pot" 100, which contains a supply of sodium bicarbonate or other moisture sensitive abrasive such as potassium bicarbonate or corn cob grit, is not pressurized by compressed air (which contains moisture) but rather by a source of dry gas such as nitrogen contained by a bottle 101. The nitrogen is fed via a line 102, a shut-off valve 103, a regulator valve 104, and a check valve 105 to the interior of the hopper 100. Compressed air in line 110 passes through a high volume pressure regulating valve 112 to a dryer or moisture separator 113, after which it is fed via a shut-off valve 114 to a regulator valve 115 and an automatic shut-off valve 116 to a line 117 that passes underneath the bottom of the hopper 100. A flow of abrasive particles under pressure comes down through feed line 118 and a metering valve 119 to a tee connection in the line 117, after which the combined flow of abrasive particles, nitrogen and compressed air is transported to the abrasive particle inlet of the nozzle assembly 23 (FIG. 1).

To prevent air in the line 117 from coming into the hopper 100, the regulator valves 104 and 115 preferably are coupled together in a manner such that the internal pressure in the hopper, which contains sodium bicarbonate particles, is always greater than the pressure in the blast line 117. Functionally separate regulating valves can be used provided they each have a high sensitivity. The magnitude of positive pressure differential can be used to very precisely control the weight per unit time of sodium bicarbonate that is used in the paint stripping operation, whereby the present invention provides a very effective metering and feed system for abrasive particles depending upon operational requirements.

OPERATION

As an example of operation of the present invention, suppose that compressed air in the blast line 117 has a pressure of 100 psi and a flow rate of 200 cfm and the pressure of the nitrogen gas in the line 102 is regulated so that pressure in the hopper 100 is maintained at 102 psi. The positive pressure differential of 2 psi provides a controlled feed of abrasive particles into the line 117 leading to the nozzle assembly 23. With the embodiment shown in FIG. 2, an abrasive flow can be achieved due to gravity when the hopper and transport line pressure are equal. The amount of abrasive particles can be very precisely controlled by controlling the magnitude of the pressure differential between the transport line pressure and the hopper pressure, and can be set, for example, at 10 lbs per min., or 600 lbs. per hour. Since no moisture is present in the nitrogen gas, the flow of sodium bicarbonate abrasive into the line 117 is very uniform to yield optimum paint stripping results.

Figure 3:
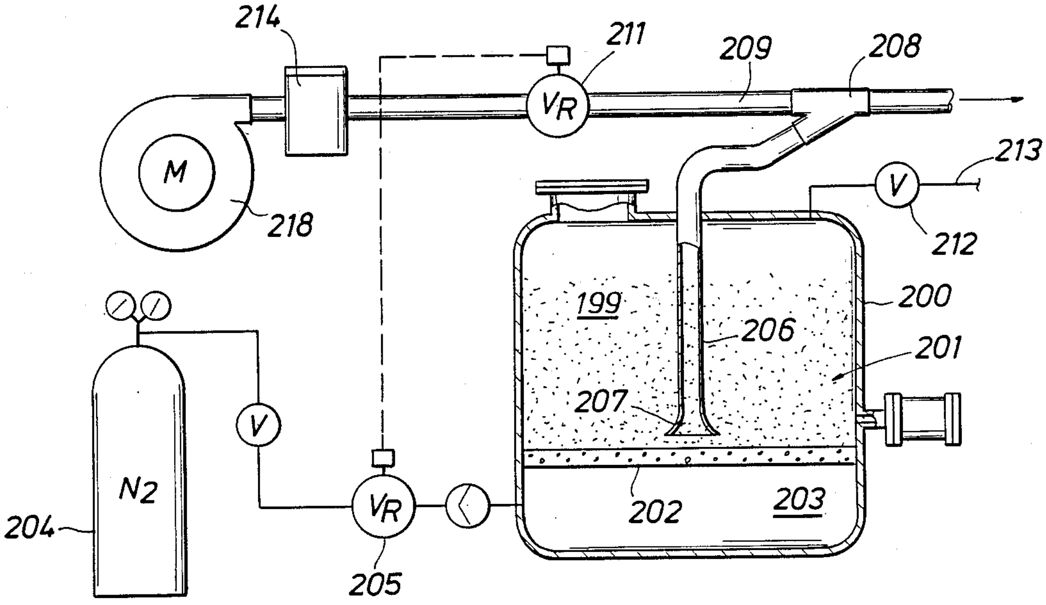
FIG. 3 view of another embodiment of the present invention.

Another embodiment of the present invention is shown in FIG. 3. The hopper 200 contains a fluidized bed of blast particles 201 in a region 199 above a porous membrane 202. The region 203 below the membrane 202 is supplied with a dry gas such as nitrogen from a supply bottle 204 via a regulator valve 205. A blast particle up-take line 206 having a flared entrance 207 passes through the top of the hopper 200 where it is connected by a Y-fitting 208 to a blast line 209 that comes from a high volume compressed air source 210 via a dryer 214 and a regulator valve 211. An atmosphere vent line 212 is normally closed by a valve 213. The apparatus shown in FIG. 3 has the advantage of being able to use the fluidization gas to dry an abrasive that has become contaminated with moisture, and thus recover and use abrasive that would otherwise have to be discarded.

In operation, the region 203 is supplied with a very clean, dry gas such as nitrogen from vessel 204, which passes through porous membrane 202 to "fluidize" the abrasive particles such as sodium bicarbonate in the region 199 above the membrane. The pressure in region 203 can be, for example, 103 psi, and the pressure in region 199 about 102 psi. The pressure in blast line 209 is regulated at 100 psi and a 200 cfm air flow rate.

The abrasive particle flow downstream of the wye 208 will be about 10 lbs. per min. (600 lbs. per hour) for an abrasive fluidized density of 50 lbs. per cubic foot. The amount of flow can be very precisely controlled by changing the pressure differential, depending upon operational requirements of the cleaning or paint stripping operation. The absence of moisture in the hopper 200 enables use of an abrasive such as sodium bicarbonate to strip a coat of paint from an aluminum or fiberglass substrate without damage to the metal or the fiberglass.

Although nitrogen has been proposed as the gaseous medium for use in the present invention, other noncombustible dry gases could be used, such as carbon dioxide or helium. A wide variety of abrasive particles can be used, that could not heretofore be used, because of flow problems encountered.

Since certain changes or modifications can be made in the disclosed embodiments without departing from the inventive concepts involved, it is the aim of the appended claims to cover all such changes and modifications falling within the true spirit and scope of the present invention.

What is claimed is:

1. Liquid-propelled abrasive cleaning apparatus comprising:

- nozzle means having a body with an interior propulsion chamber having a water inlet, an air and abrasive inlet and an outlet all communicating with said interior propulsion chamber through said housing;
- pump and conduit means for furnishing water under high pressure to said nozzle means;
- transport line means for conveying a mixture of compressed air and sodium bicarbonate particles to said air and abrasive inlet of said propulsion chamber;
- means containing a supply of sodium bicarbonate particles to be delivered under pressure to said transport line means;
- nitrogen gas supply means for supplying nitrogen under pressure to said containing means to provide a pressurized flow of sodium bicarbonate particles to said transport line means;
- supply means independent of said nitrogen gas supply means for supplying pressurized air to said transport line means, and
- regulator means for maintaining a positive pressure differential between the interior of said containing means pressurized by said nitrogen, and said transport line means pressurized by said supply of pressurized air.

2. The apparatus of claim 1 wherein said abrasive is sodium bicarbonate.

3. The apparatus of claim 1 further including dryer means in said transport line means for reducing the moisture content of said compressed air.

4. The apparatus of claim 1 wherein said containing means has a porous membrane therein for separating the interior thereof into an upper region and a lower region, said nitrogen being supplied to said lower region and passing through said membrane to create a fluidized bed of abrasive particles in said upper region.

5. The apparatus of claim 4 further including a pick-up line extending into said containing means to a location adjacent said membrane, said pick-up line being connected to said transport line means, said positive pressure differential causing a metered amount of said abrasive to flow into said transport line means.

6. Apparatus for use in an abrasive blasting system, comprising,

- means containing a quantity of abrasive particles;
- conduit means for supplying a dry gas under pressure to the interior of said containing means;
- transport line means connected to a source of pressurized air for transporting abrasive in said abrasive blasting system;
- an abrasive particle feed line connecting the interior of said containing means to said transport line means;
- first pressure regulating valve means disposed in said conduit means for controlling the pressure of said dry gas as applied to said interior of said containing means; and
- second pressure regulating valve means disposed in said transport line means for regulating the pressure of air in said transport line means;
- whereby said first pressure regulating valve means and said second pressure regulating valve means may be adjusted to maintain a pressure in said container means that is greater than the pressure of air flowing in said transport line to permit a controlled amount of flow of said abrasive from said container means via said abrasive particle feed line into said transport line to permit a controlled amount of flow of said abrasive into said transport line.

7. The apparatus of claim 6 wherein said abrasive particle feed line extends from the bottom of said containing means to a point of connection with said transport line.

8. The apparatus of claim 6 further including valve means in said feed line for controlling the flow of abrasive therethrough.

9. The apparatus of claim 8 further including dryer means in said transport line upstream of the point of connection of said feed line thereto for reducing the moisture content of said compressed air.

10. The apparatus of claim 6 further including a porous membrane in said containing means dividing the interior thereof into a lower region and an upper region, said dry gas being supplied to said lower region and passing through said membrane to create a fluidized bed of abrasive particles in said upper region.

11. The apparatus of claim 10 wherein said abrasive particle feed line extends from a location above said membrane out the top of said containing means to a point of connection with said transport line.

12. The apparatus of claim 6 wherein said dry gas is nitrogen.

13. The apparatus of claim 6 wherein said abrasive is sodium bicarbonate.

14. A method of supplying a controlled amount of abrasive particles from a container to a transport line having a stream of compressed air flowing therethrough, comprising the steps of: pressurizing the interior of said container with a dry gas; and maintaining a pressure of the gas in said container that is greater than the pressure of the compressed air flowing in said transport line, the difference in said pressures causing abrasive particles to flow from said container into said transport line and preventing the compressed air in said transport line from entering said container.

15. The method of claim 8 wherein said abrasive particles consist of sodium bicarbonate, and said surface has a coating of paint to be stripped away by performing said method.

16. The method of claim 14 wherein said abrasive particles are sodium bicarbonate.

17. The method of claim 14 wherein said gas is nitrogen.

18. The method of claim 14 including the additional steps of transporting the resulting mixture of compressed air, gas and abrasive particles to a nozzle having a water supply inlet; and propelling said abrasive particles onto a surface to be cleaned with water under high pressure supplied to said inlet.

19. With a propulsion chamber having an outlet, a water inlet and an air/abrasive inlet, the method of cleaning a surface of paint, corrosion or the like, comprising the steps of applying a source of high pressure water to said water inlet of said propulsion chamber, applying a stream of bicarbonate of soda particles entrained in air to said air/abrasive inlet of said propulsion chamber, accelerating said bicarbonate of soda particles with said high pressure water inside said propulsion chamber and directing same in a high energy blast via said outlet of said propulsion chamber, and directing the outlet of said propulsion chamber against said surface to be cleaned, the hardness of said surface being approximately the same as the hardness of said particles of bicarbonate of soda.

20. The method of claim 19 wherein said surface has a moh hardness of about 3.

21. The method of claim 19 wherein said surface is aluminum.

22. The method of claim 19 wherein said surface is fiberglass.

23. The method of claim 19 wherein said surface is a carbon fiber laminate.

* * * * *